United States Patent [19]

Braden, Jr.

[11] 3,856,086
[45] Dec. 24, 1974

[54] MISCIBLE OIL RECOVERY PROCESS

[75] Inventor: William B. Braden, Jr., Houston, Tex.

[73] Assignee: Texaco Inc., New York, N.Y.

[22] Filed: Oct. 6, 1972

[21] Appl. No.: 295,771

[52] U.S. Cl.................................. 166/274, 166/273
[51] Int. Cl.............................................. E21b 43/16
[58] Field of Search ............ 166/266, 273, 274, 275

[56] References Cited
UNITED STATES PATENTS

| | | | |
|---|---|---|---|
| 2,880,801 | 4/1959 | Crump | 166/266 |
| 3,096,821 | 7/1963 | Dyes | 166/273 |
| 3,126,951 | 3/1964 | Santourian | 166/274 |
| 3,134,433 | 5/1964 | Bocquet | 166/273 |
| 3,157,230 | 11/1964 | Connally et al. | 166/274 |
| 3,249,157 | 5/1966 | Brigham et al. | 166/273 |

*Primary Examiner*—Ernest R. Purser
*Assistant Examiner*—Jack E. Ebel
*Attorney, Agent, or Firm*—T. H. Whaley; C. G. Ries

[57] ABSTRACT

A miscible flood process for the recovery of hydrocarbons from a hydrocarbon-bearing reservoir having a gas saturation in which a hydrocarbon solvent that has first contact miscibility with the reservoir hydrocarbon liquid is injected into the reservoir and which is thereafter followed by a drive fluid to move the previously injected solvent thru the reservoir, thereby displacing the reservoir hydrocarbons to a production well from which they are produced.

18 Claims, 1 Drawing Figure

TERNARY DIAGRAM FOR THE SYSTEM:
  GAS (G)
  INTERMEDIATES ($C_2$-$C_4$) (I)
  PENTANES PLUS ($C_5^+$) (P)

M-N (PHASE BOUNDARY CURVE AT REDUCED PRESSURE)
A-B (PHASE BOUNDARY CURVE AT BUBBLE POINT PRESSURE)

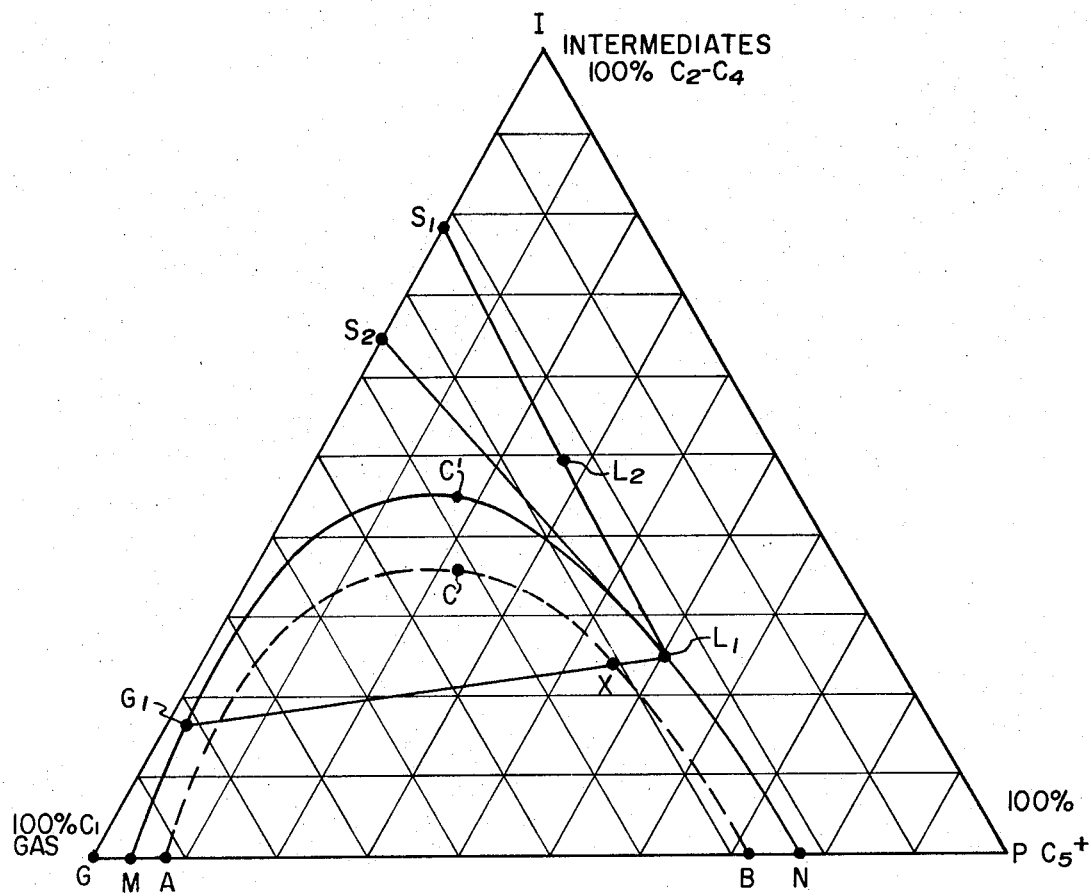

3,856,086

MISCIBLE OIL RECOVERY PROCESS

FIELD OF THE INVENTION

This invention relates to a process for the recovery of hydrocarbons from a subterranean hydrocarbon-bearing reservoir having a gas saturation by injecting thereinto a solvent that has first contact miscibility with the liquid portion of the reservoir hydrocarbons. Thereafter, a drive fluid is injected to move the solvent thru the reservoir, thereby displacing the reservoir hydrocarbons to a production well from which they are produced.

DESCRIPTION OF THE PRIOR ART

In the recovery of oil from an underground reservoir one method that has been suggested for improving oil recovery is that of miscible flooding wherein a solvent is injected into the reservoir to push and wash out the oil of the reservoir. When solvents are employed which can mix completely with the oil, the term "miscible flooding" is applied to the process.

The process of miscible flooding is very effective in stripping and displacing the reservoir oil from the reservoir thru which the solvent flows. This effectiveness is derived from the fact that a two-phase system within the reservoir and between the solvent and the reservoir fluid is eliminated at the conditions of temperature and pressure of the reservoir, thereby eliminating the retentive forces of capillarity and interfacial tension which are significant factors in reducing the recovery efficiency of oil in conventional flooding operations where the displacing agent and the reservoir oil exist as two phases in the reservoir.

One of the principal problems that occurs in the application of miscible flooding is how best to utilize the solvent injected, since the cost of the solvent may be comparable to the cost of the reservoir oil to be recovered. One technique that has been used is reclamation and recycling of the solvent as, for example, is done in the LPG recycling process.

Another technique that is used employs a slug of a solvent that is capable of mixing completely with the reservoir hydrocarbons, i.e., one which is miscible with the hydrocarbons and which is thereafter displaced thru the reservoir by a drive agent subsequently injected. Combinations of these two techniques are also used.

In another development of the miscible slug process a displacing agent or solvent may be used that is not miscible upon initial contact with the reservoir oil, but which becomes miscible with the reservoir oil thru the preferential absorption by the reservoir oil of the intermediate components present in the displacing agent or solvent. This process which leads to miscibility between the displacing agent and the oil, as the oil becomes richer in the intermediates, is known as an enriched gas drive.

One of the techniques of primary production from an oil-bearing reservoir is the use of a solution gas drive whereby the reservoir is produced by a pressure depletion and a liquid expansion. As the pressure of the reservoir is reduced, a pressure is reached that is termed the saturation pressure or "bubble point pressure" at which point a gas saturation develops and two phases, gas and liquid, exist in the reservoir. Further production by pressure depletion results in an increasing gas saturation. When the gas saturation increases to a point where the gas becomes a continuous phase, gas permeability is so high that little additional oil production is realized and thereafter, in order to obtain further production, it is necessary to employ some type of secondary recovery process. Pressure depletion of a reservoir after the bubble point pressure has been reached in the oil column may be continued until the gas saturation is about 30 percent of the hydrocarbon pore volume. By hydrocarbon pore volume is meant that fraction of the void volume or pore volume of the reservoir that contains fluid hydrocarbons.

Among the types of secondary processes that have been used following solution gas drive is the miscible slug process. In the application of a miscible flood to a reservoir having a gas saturation, that is, free gas existing in the oil column, a prepressuring of the reservoir to substantially eliminate the free gas phase is generally undertaken prior to the initiation of the miscible flood process.

Prior art also teaches the application of a miscible process in a reservoir having a gas saturation wherein the hydrocarbon solvent is miscible with both the gas and the liquid phases of the reservoir fluid.

I have found that a miscible recovery process may be successfully applied to a reservoir having a gas saturation that is, a gas phase in the oil column without repressuring the formation and without requiring the injected solvent to be miscible with both the gas and the liquid phases.

SUMMARY OF THE INVENTION

This invention relates to a miscible flood process for the recovery of hydrocarbons from a subterranean hydrocarbon-bearing reservoir having a gas saturation in which a hydrocarbon solvent is injected that has first contact miscibility with the reservoir hydrocarbon liquid which thereafter is displaced thru the reservoir by the injection of a drive fluid.

BRIEF DESCRIPTION OF THE FIGURE

The accompanying ternary diagram illustrates a three-component composition diagram for a complex hydrocarbon system, illustrative of this invention.

DESCRIPTION OF THE INVENTION

In its broadest aspect the invention relates to a miscible flood that can be applied to a subterranean hydrocarbon-bearing reservoir having a gas saturation or to a reservoir that has been pressure depleted below its bubble point pressure. A solvent, miscible on first contact with the equilibrium liquid portion of the reservoir fluid, is injected and is thereafter driven thru the reservoir by injection of a drive fluid. By operating within the described manner, which will become apparent from the following discussion, essentially complete displacement of the liquid hydrocarbon oil is obtained without the necessity to repressure the formation or to employ a solvent that is miscible with both the gas and liquid phases.

Under a given set of conditions of temperature and pressure for a hydrocarbon-bearing reservoir, there exists a mixture of hydrocarbons having a composition such that when contacted with the reservoir liquid at the temperature and pressure of the reservoir, the mixture of hydrocarbons will form with the reservoir liquid on first contact an admixture of a single fluid phase wherein no discernible phase change exists and the reservoir liquid loses its identity. When this occurs the forces of capillarity and interfacial tension associated with the oil-bearing reservoir are reduced to zero, thereby releasing the hydrocarbon liquid in the matrices of the reservoir to the mixture of the single fluid phase. This phenomenon can be demonstrated by referring to the accompanying FIGURE. It should be pointed out that although the depiction of a complex hydrocarbon system such as is found in an oil-bearing reservoir is somewhat arbitrary, the graphical representation as seen in the accompanying FIGURE is useful in explaining qualitatively the events that occur within the reservoir during the practice of this invention.

In the three component composition diagram shown in the accompanying FIGURE, often referred to as a ternary diagram, the three components are (G) a gas ($C_1$), (I) intermediates ($C_2$–$C_4$), (P) pentanes plus ($C_5+$), and are represented by the vertices of the triangle. The phase relations among the three components are depicted thereon for a given temperature and pressure.

The sides of the triangle represent mixtures of the components connected by the respective vertices of the triangle and may be referred to as pseudo-binary mixtures. The composition of the components contained in the pseudo-binary mixtures is given by the scale along the sides of the triangle and is in mol percent. A point within the triangle represents a composition containing all three components and its composition is determined by the appropriate mol percent values at the intersection of the point. Such a composition within the triangle may be homogeneous in one phase or heterogeneous in two phases.

The dotted curve A, C, B represents the phase envelope curve at the existing temperature and bubble point pressure of the reservoir prior to pressure depletion. In the area within this phase envelope two phases exist in equilibrium, viz., gas and liquid, whereas outside this envelope only one phase exists. Point X represents a given composition of a reservoir fluid at the bubble point pressure. The bubble point pressure is defined as the minimum pressure at which the first bubble of free gas appears in the liquid and comes out of solution. If the pressure on the reservoir is reduced, the phase envelope will increase in area. This situation is depicted by curve M, C', N.

For a given reservoir having a hydrocarbon composition X, as shown in the FIGURE at the original pressure of the reservoir, the reservoir fluids exist as a single phase at saturated conditions. Upon pressure reduction, two phases will appear, namely liquid, $L_1$, and gas, $G_1$, which phases are in equilibrium with each other. If a solvent represented by $S_1$ is contacted with $L_1$ the resulting composition will be along a line connecting $L_1$ and $S_1$, for example, shown by $L_2$. A tangent to $L_1$ and intersecting the left side of the triangle at $S_2$ represents the minimum composition of the solvent that is miscible in all proportions with $L_1$, hence affording miscibility on first contact.

In the application of this invention to a reservoir at a pressure lower than the bubble point pressure, a solvent having a composition between I and $S_2$ that is capable of first contact miscibility with the reservoir oil at its bubble point pressure is injected into a reservoir, which reservoir has a hydrocarbon fluid of composition represented by X. The fluid has two phases in equilibrium with each other, represented by $G_1$ and $L_1$. Upon injection of the solvent, the equilibrium gas $G_1$, having a greater mobility than the liquid, will be more rapidly displaced thru the reservoir by the injected solvent than will be the equilibrium liquid $L_1$, which will be miscibly displaced by the solvent. Upon the establishment of a miscible zone between the solvent, e.g., $S_1$ and $L_1$, essentially complete displacement of the reservoir liquid will occur.

The solvent is injected in an amount sufficient to establish a miscible transition zone with the reservoir equilibrium liquid. Generally, the amount of solvent injected is in the range of from about 1 percent to about 30 percent of the hydrocarbon pore volume. While the solvent is usually injected alone, in instances where improved mobility control is sought, water or brine, either thickened or unthickened, may be injected simultaneously or alternately with the solvent. The use of thickeners, such as polyacrylamides, to increase the viscosity of aqueous liquids thereby improving mobility control is well-known in the art.

The solvent may be any hydrocarbon having from two to six carbon atoms in the molecule or mixtures thereof. The solvent may also comprise a mixture of methane or natural gas and at least one hydrocarbon having from two to six carbon atoms per molecule. In addition, the solvent may also contain other constituents such as carbon dioxide, hydrogen sulfide, sulfur dioxide, separator gas and mixtures thereof. The solvent, in short, within the scope of the invention, may have any composition provided that it meets the requirements of having first contact miscibility with the reservoir hydrocarbon liquid. Separator gas as defined herein, means a gas that is generally mostly methane with some $C_2+$ present, depending on separator conditions.

After a sufficient quantity of solvent has been injected, a drive fluid is injected to displace the solvent and the reservoir fluids thru the reservoir. The drive fluid may be a drive gas such as methane, natural gas, carbon dioxide, nitrogen, air, flue gas or mixtures thereof, or it may be water or brine, either thickened or unthickened, to improve the mobility ratio. The drive fluid may also be a mixture of air and water or gas and water injected simultaneously or in alternate fashion so as to improve sweep efficiency. Furthermore, the drive fluid may have miscibility with the trailing edge of the solvent slug although the scope of the invention is not limited to trailing edge miscibility.

It is also within the scope of the invention to apply the process either as a horizontal displacement technique wherein the slug of the hydrocarbon solvent is established to form a circumferential ring expanding outwardly from the injection well as the process is continued, or it can be used in a vertical displacement wherein a blanket of the solvent is established and displaced downward by a fluid. In addition, the process may also be employed in dipping reservoirs wherein displacement of the reservoir is downward along the strike of the reservoir.

I claim:

1. A process for recovering hydrocarbons from a hydrocarbon-bearing reservoir having a hydrocarbon liquid phase and a gas saturation, traversed by at least one injection well and one production well, comprising the steps of:

a. determining the composition of a hydrocarbon solvent that is miscible on first contact with said liquid phase at the temperature and pressure of said reservoir, b. injecting into said reservoir via said injection well a slug of said hydrocarbon solvent in an amount sufficient to establish a miscible transition zone of said slug with said hydrocarbon liquid phase, c. injecting into said reservoir a drive fluid at a pressure and in an amount sufficient to maintain a drive of said slug and said reservoir hydrocarbons toward said production well and, d. recovering said hydrocarbons via said production well.

2. The process of claim 1 wherein said hydrocarbon solvent comprises a mixture of methane and at least one hydrocarbon having from two to six carbon atoms per molecule.

3. The process of claim 1 wherein said hydrocarbon solvent contains methane, natural gas, carbon dioxide, hydrogen sulfide, sulfur dioxide, separator gas and mixtures thereof.

4. The process of claim 1 wherein water, brine, thickened water, thickened brine and mixtures thereof are injected simultaneously or alternately with said hydrocarbon solvent.

5. The process of claim 1 wherein said drive fluid is selected from the group consisting of methane, natural gas, carbon dioxide, nitrogen, air, flue gas and mixtures thereof.

6. The process of claim 1 wherein said drive fluid is water, brine, thickened water, thickened brine and mixtures thereof.

7. The process of claim 1 wherein said drive fluid is a gas and water injected as a mixture.

8. The process of claim 1, wherein said drive fluid is a gas and water, said gas and water being injected alternately.

9. The process of claim 1 wherein step (a) is preceded by pressure depletion to a pressure less than the reservoir bubble point pressure.

10. A process for recovering hydrocarbons from a hydrocarbon-bearing reservoir, said reservoir being traversed by at least one injection well and one production well, comprising the steps of:

a. producing said reservoir by pressure depletion to a pressure at which a gas saturation and a hydrocarbon liquid phase are established in said reservoir, b. determining the composition of a hydrocarbon solvent that is miscible on first contact with said liquid phase at the temperature and pressure of said reservoir, c. injecting into said reservoir via said injection well a slug of said hydrocarbon solvent in an amount sufficient to establish a transition zone of said slug with said liquid phase, d. injecting into said reservoir a drive fluid at a pressure and in an amount sufficient to maintain a drive of said slug and said reservoir hydrocarbons towards said production well and, e. recovering said hydrocarbon via said production well.

11. The process of claim 10 wherein said pressure depletion is continued to a pressure in the range of from the bubble point pressure to a pressure at which the gas saturation is about 30 percent of the hydrocarbon pore volume.

12. The process of claim 10 wherein said hydrocarbon solvent comprises a mixture of methane and at least one hydrocarbon having from two to six carbon atoms per molecule.

13. The process of claim 10 wherein said hydrocarbon solvent contains methane, natural gas, carbon dioxide, hydrogen sulfide, sulfur dioxide, separator gas and mixtures thereof.

14. The process of claim 10 wherein water, brine, thickened water, thickened brine and mixtures thereof are injected simultaneously or alternately with said hydrocarbon solvent.

15. The process of claim 10 wherein said drive agent is selected from the group consisting of methane, natural gas, carbon dioxide, nitrogen, air, flue gas and mixtures thereof.

16. The process of claim 10 wherein said drive fluid is water, brine, thickened water, thickened brine and mixtures thereof.

17. The process of claim 10 wherein said drive fluid is a gas and water, injected as a mixture.

18. The process of claim 10 wherein said drive fluid is a gas and water, said gas and water being injected alternately.

* * * * *